US012179119B2

(12) United States Patent
Kim et al.

(10) Patent No.: US 12,179,119 B2
(45) Date of Patent: Dec. 31, 2024

(54) CHEAT DETECTION BY COMPARING MOUSE INPUT AND FRAME BUFFER

(71) Applicant: Nvidia Corporation, Santa Clara, CA (US)

(72) Inventors: Joohwan Kim, Santa Clara, CA (US); Josef Spjut, Durham, NC (US)

(73) Assignee: NVIDIA Corporation, Santa Clara, CA (US)

( * ) Notice: Subject to any disclaimer, the term of this patent is extended or adjusted under 35 U.S.C. 154(b) by 231 days.

(21) Appl. No.: 17/828,734

(22) Filed: May 31, 2022

(65) Prior Publication Data
US 2023/0241512 A1 Aug. 3, 2023

Related U.S. Application Data

(60) Provisional application No. 63/305,970, filed on Feb. 2, 2022.

(51) Int. Cl.
| A63F 13/75 | (2014.01) |
| G06F 3/0354 | (2013.01) |
| G06F 3/038 | (2013.01) |
| G06T 7/215 | (2017.01) |
| G08B 21/18 | (2006.01) |

(52) U.S. Cl.
CPC .......... *A63F 13/75* (2014.09); *G06F 3/03544* (2013.01); *G06F 3/038* (2013.01); *G06T 7/215* (2017.01); *G08B 21/182* (2013.01); *G06T 2207/10016* (2013.01); *G06T 2207/30244* (2013.01)

(58) Field of Classification Search
CPC ........................................................ A63F 13/75
See application file for complete search history.

(56) References Cited

U.S. PATENT DOCUMENTS

| 11,458,405 | B1* | 10/2022 | Welch | H04L 67/131 |
| 2002/0021283 | A1* | 2/2002 | Rosenberg | G06F 3/016 |
| | | | | 345/156 |
| 2006/0252474 | A1* | 11/2006 | Zalewski | A63F 13/428 |
| | | | | 463/1 |
| 2008/0070658 | A1* | 3/2008 | Labgold | G07F 17/3293 |
| | | | | 463/11 |
| 2010/0277489 | A1* | 11/2010 | Geisner | A63F 13/42 |
| | | | | 345/581 |
| 2021/0303128 | A1* | 9/2021 | Ho | G06F 3/04812 |

\* cited by examiner

*Primary Examiner* — Jasson H Yoo

(57) ABSTRACT

The disclosure provides a cheating detection strategy for interactive programs, which detects programmatically-generated motion from actual human-generated motion based on a comparison of actual motion data to inferred motion data. The cheating detection strategy uses visual and input information to ensure that the input matches the output to detect and avoid cheating tools positioned in between the input and the output. In one example, the disclosure provide a method of monitoring cheating in interactive programs that includes: (1) receiving actual motion data from a user input device, wherein the actual motion data corresponds to interacting with the interactive program, (2) receiving image data of the interactive program that includes image sequences of the interactive program to display on a screen, (3) comparing the actual motion data to inferred motion data determined from the image sequences, and (4) determining possible cheating based on the comparing.

20 Claims, 12 Drawing Sheets

CHEAT DETECTION BY COMPARING MOUSE INPUT AND FRAME BUFFER

CROSS-REFERENCE TO RELATED APPLICATION

This application claims the benefit of U.S. Provisional Application Ser. No. 63/305,970, filed by Joohwan Kim, et al., on Feb. 2, 2022, entitled "CHEAT DETECTION BY COMPARING MOUSE INPUT AND FRAME BUFFER," commonly assigned with this application and incorporated herein by reference in its entirety.

TECHNICAL FIELD

This application is directed, in general, to detecting cheating in video game play and, more specifically, to detecting cheating at a monitor that displays the video game.

BACKGROUND

With the advent of esports, competitive game play has offered users significant financial opportunities. As such, some users have tried to take advantage of existing game play systems by using a cheating tool(s) in order to improve their ranking, increase winnings, or otherwise gain an advantage over other users. Thus, game developers and game hardware manufacturers, at a minimum, have an interest in keeping their products immune from cheating tools to ensure the competitive integrity of otherwise fair game play. Otherwise, users who are playing a game where they believe cheating is occurring may stop playing the game and even limit purchasing games from the same game developer in the future.

SUMMARY

In one aspect, the disclosure provides a method of monitoring cheating in interactive programs. In one example, the method includes: (1) receiving actual motion data from a user input device, wherein the actual motion data corresponds to interacting with an interactive program, (2) receiving image data of the interactive program that includes an image sequence of the interactive program to display on a screen, (3) comparing the actual motion data to inferred motion data determined from the image sequence, and (4) determining possible cheating based on the comparing.

In another aspect, a computer program product is disclosed. In one example, the computer program product has a series of operating instructions stored on a non-transitory computer readable medium that direct the operation of one or more processors to perform operations including: (2) comparing actual motion data to inferred motion data determined from image sequences, wherein the actual motion data is from a user input device and corresponds to interacting with an interactive program, and the image sequences are from the interactive program, and (2) determining possible cheating based on the comparing.

In yet another aspect, the disclosure provides a monitor. In one example the monitor includes: (1) a screen, (2) an input port configured to receive actual motion data from a user input device, wherein the actual motion data corresponds to interacting with an interactive program on the screen, and (3) one or more processors to perform operations including receiving image data of the interactive program that includes image sequences of the interactive program to display on the screen, comparing the actual motion data to inferred motion data determined from the image sequences, and determining possible cheating based on the comparing.

In still another aspect, the disclosure provides a monitoring system for cheating. In one example, the monitoring system includes: (1) one or more interfaces to receive actual motion data from a user input device and image data, wherein the actual motion data corresponds to interacting with an interactive program, and the image data is from the interactive program and includes image sequences of the interactive program to display on a screen, and (2) one or more processors to perform operations including comparing the actual motion data to inferred motion data determined from the image sequences, and determining possible cheating based on the comparing.

In yet another different aspect, the disclosure provides a cheat detection system for video game play. In one example, the cheat detection system has one or more processors to perform operations including: (1) receiving cheating alerts associated with a user executing a video game, wherein one type of the cheating alerts is based on a comparison of actual motion data from an input device used by a user playing the video game and inferred motion data corresponding to an image sequence of the video game that is displayed, and (2) determining a likelihood of cheating by the user based on the cheating alerts received over a designated amount of time.

BRIEF DESCRIPTION

Reference is now made to the following descriptions taken in conjunction with the accompanying drawings, in which.

DETAILED DESCRIPTION

Figure 1:
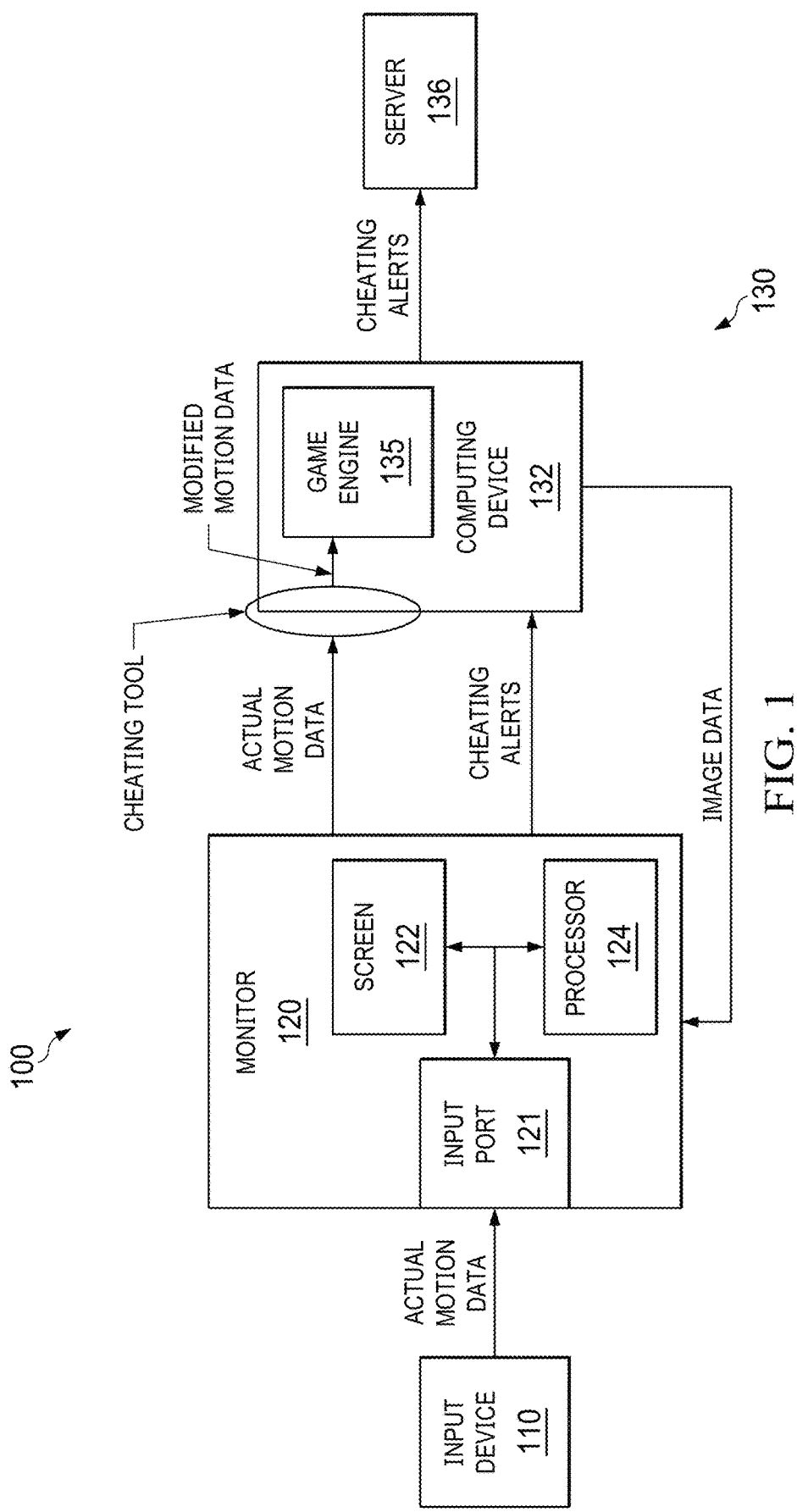
FIG. 1 illustrates a block diagram of an example of a computing system constructed according to the principles of the disclosure.

There is a wide array of ways for users to cheat when playing a video game. Many of the cheating methods or strategies can be thwarted by executing the video games in a trusted execution environment (TEE). A TEE is a designated portion of a processor or processors, or a piece of software that runs on a processor(s), that guarantees the data and code execution therein are secure. Nevertheless, some cheating may still go undetected even when video games are executed in such a TEE.

For example, some game cheating software injects synthetic motion to the actual motion corresponding to a user input device, either at a hardware or software level, to improve user performance in competitive games. In this cheating scheme, cheating hardware or software, collectively referred to as a cheating tool, can look at a video game via a display or a software version of the display, react to the video game by moving and/or modifying motion of the mouse, and provide a corresponding motion input to the game system, such as via a USB port. As such, the cheating tool is potentially taking nothing out of the game system beyond the visual information a typical user would receive and is providing nothing to the game system except for the type of packet data delivered via USB that the game system would usually receive from an input device. This type of cheating scheme cannot be detected via traditional TEEs and is often designed to function together with a user as opposed to completely directing user motion on its own. In this type of cheating scheme, the users are not simply obtaining information through, for example, pixel data or memory access, but are providing or modifying inputs based on the information that is obtained. Accordingly, users can still feel like they are skilled at playing the video game and the fun of playing can be preserved.

Instead of improving a user's action, a cheating tool could also intervene and impair a user's action. For example, a cheating tool may be installed or hacked by another party instead of the user and used to modify the actual motion data such that a target is missed. As such, cheating can also occur in other interactive applications, or programs, besides video games, wherein a visual output is provided and a human input is received. Examples of such interactive programs include computer aided drafting (CAD) programs, authoring tools, animation programs, digital audio program (e.g., Garage Band), electronic document signing tools, and imaging software (e.g., x-rays, CT scans). For example, another party could alter a signature on a document signing tool. As such, cheating as used herein is altering or modifying input of a user that is in response to interacting with an interactive program. The modifying can be based on the knowledge of privileged state information of the interactive program. A user includes a human interacting with an interactive program, such as game player or gamer.

Accordingly, the disclosure provides a cheating detection strategy for interactive programs, which detects programmatically-generated motion from actual human-generated motion based on a comparison of actual motion data to inferred motion data. The cheating detection strategy uses visual and input information to ensure that the input matches the output to detect and avoid cheating tools positioned in between the input and the output. As noted above, an example of interactive programs are video games, which will be used herein as non-limiting examples for the cheating detection strategy. For example, a cheating tool could automatically move a user's aim in a video game to a correct target when within a set region around a target and perform the action associated with hitting the target. A user still feels like they are playing the game, but when the user activates their input device, such as shooting a gun or clicking a mouse button, the cheating tool intervenes and makes changes to complete or improve the action for the user. As noted above, a cheating tool can also be used to intervene and impair a user's action. Regardless for improving or impairing, the cheating detection strategy disclosed herein recognizes that these changes, which are included in the image sequences of the interactive program, do not match with the actual motion data that is provided from an input device. The cheating detection strategy can compare actual motion data provided from a user input device in response to a user interacting with an interactive program to inferred motion data based on image sequences of the interactive program to detect possible cheating.

The comparison can be performed at a monitor that receives the actual motion data from the input device and receives image sequences of the interactive program from a computing device that is a different device than the monitor for display on the monitor.

A monitor is disclosed that directly receives the actual motion data from user inputs, displays visual outputs of the video game to the user, and performs a direct comparison between the user inputs and outputs to detect any nefarious modifications. The monitor can be, for example, a G-SYNC monitor available from Nvidia Corporation of Santa Clara, California. Another example of a thin client that can be used is software in a TV dongle, such as SHIELD TV from Nvidia. The logic or a portion of the logic for comparing the actual motion data to what is actually output can be located on other computing devices instead of a monitor, such as a client computing device or another device upon which the interactive program executes.

Actual motion data from an input device can be sent to the monitor via a wireless (e.g., Bluetooth compliant) or wired (e.g., USB compliant) connection and is received and read through an input communication port of the monitor, such as a USB port used for a Reflex Latency Analyzer (RLA) monitor. The actual motion data can be stored in an input buffer of the monitor. The actual motion data is change in positional information over time that represents the user's input to the user input device. The actual motion data can be a discrete time series sample of a real motion path that the user delivered. The sample of points along the path are reported and stored in an input buffer of the monitor for further processing, e.g., comparison.

The user input device is an aiming device that includes without limitation a mouse, a touchpad, or a spatially tracked controller, such as a gun, a Wii remote associated with a Nintendo gaming system available from Nintendo of America Inc. in Redmond, Washington, virtual reality (VR) controllers, and other motion sensing input devices. The positional information can be a time series of x and y or x, y, and z coordinates of input device motion, which can ignore position resets of the input device. The positional information can also be or include degrees of aim displacement, such as for first/third person video games. Using degrees can allow, for example, compensating for mouse sensitivity when a mouse is the input device. The positional information, for example, can correspond to cursor motion for a cursor motion video game or camera motion for a camera motion video game. Examples of a cursor motion video game include Real Time Strategy (RTS) and Multi-player Online Battle Arena (MOBA) and examples of a camera motion video game include First Person Shooter (FPS) or Third Person Shooter (TPS) video games.

The disclosed cheating detection strategy works with both cursor based and camera based modes. Understanding which mode type is active, such as a cursor based or camera based mode, is beneficial for the cheating detection strategy; especially for video games that can switch between the modes. Modes can be detected from game state information when a video game can switch between different mode types or can be detected based on the video game when there is not the possibility of switching modes.

The disclosed cheating detection strategy also works with displacement that is added to visual outputs by the game engine model affects. For example, FPS games may apply a game-engine-derived displacement to the view to model a weapon fire kickback or other things that may affect the accuracy and aim of the user outside of their raw actual motion data input. In order to compensate for the added displacement, the cheating detection strategy can estimate the displacement by allowing for some buffer in motion that can still be considered generally correct. The game engine can also inform the anti-cheat tool about these mechanics-based displacements such that the displacement can be added to the input or subtracted from the screen motion, e.g., added to the actual motion data or subtracted from inferred motion data. Game state information can be used to inform about the derived displacement.

Mouse sensitivity is a scale factor that is combination of one or more scale factors associated with a mouse, operating system (OS), game engine, and/or game implementation. A mouse sensor can have scale factor and mouse firmware can have a scale factor, such as dots per inch (DPI) or cycles per inch (CPI).

Mouse acceleration functions may be considered when present to adjust mouse sensitivity based on mouse velocity. Mouse acceleration functions may modify actual motion data from a user. However, unlike the disclosed cheating detection strategy, mouse acceleration functions do not use privileged game state information, such as where a target is located.

In addition to receiving the actual motion data, the monitor also receives image data associated with the video game. The image data is received from a computing device that is communicatively coupled to the monitor, such as a client computing device or a server, and upon which the game engine for the video game is executing. The image data includes image sequences of the video game that are to be displayed on a screen of the monitor. The image sequences can be stored in a frame buffer of the monitor. The image data can also include inferred motion data that is determined by the game engine when generating the image sequences. Image data can also include game state information indicating active mode of a video game and/or the presence of displacement derived by the game engine.

The monitor can determine the inferred motion data from the image sequences instead of receiving this data. The monitor can process the image sequences stored in the frame buffer using simple computer vision algorithms on a display chip of the monitor to infer the inferred motion data. The inferred motion data can be, for example, the amount of rotation and translation the camera made in the current frame of a camera motion FPS video game. For a cursor motion FPS video game, the inferred motion data can be the dx, dy movement of a cursor in the current frame. One or more previous frames of the current frame may be stored in the frame buffer of the monitor to make this estimation. The monitor can then compare the received actual motion data to the inferred motion data to detect possible cheating. A red flag, or cheating alert, can be generated if an unexpected inconsistency is detected.

The cheating alert can be a binary alert that indicates possible cheating or no possible cheating based on the comparisons. The cheating alerts can also be gradient and indicate a likelihood of cheating or not based on the comparisons. For example, the cheating alert can indicate a 10 percent possibility of cheating or 90 percent possibility of no cheating based on how well the actual and inferred motion data match. The cheating alert can be provided to a higher level cheating detection system that collects multiple cheating alerts over a time period and makes a determination of cheating or a likelihood of cheating. The cheating detection system can use the cheating alerts as disclosed herein with cheating reports from other systems or cheat detection strategies. The cheating detection system can use an algorithm to weight the various cheating alerts and/or reports to automatically identify possible cheating. Additionally, the cheating detection system can provide an analysis for manual review.

In addition to the motion data, determining possible cheating may also require access to game information as game states may make some user movements impossible. Game information that could be useful for accurate detection of cheating includes but is not limited to: frame time, mouse sensitivity, sensitivity conversion factor (a constant per game), sensitivity modulation functions (e.g. 'enhance precision' feature in Windows), etc. A monitor may not have access to all the game information that would be beneficial for identifying possible cheating. Thus, while a monitor can detect possible cheating and provide alerts, the final decision of cheating may occur somewhere else in a cheat detection system that has access to additional game information.

The disclosed cheating detection strategy may not prevent cheating but will make cheating significantly harder to perform because one would need specialized hardware and/or substantially sacrifice player performance/ergonomics to do so. Moreover, the cheating detection strategy will essentially block any cheats in certain circumstances, such as tournaments, where one can force esport athletes to plug their input device, such as a mouse, into monitors or other computing devices implementing the disclosed cheating detection strategy.

FIG. 1 illustrates a block diagram of an example of a gaming system 100 constructed according to the principles of the disclosure. The gaming system 100 represents a computing system executing a particular type of interactive program, a video game, and includes the cheating detection strategy as disclosed herein. The gaming system 100 includes a user input device 110, a monitor 120, and a game computing system 130.

The user input device 110 captures a user's interaction with image sequences of a video game displayed on screen 122 of monitor 120. The user input device 110 provides the user's interactions as actual motion data to monitor 120 that is then provided to game computing system 130. The input device 110 can send the actual motion data to an input port 121 of monitor 120 via a connection that is wireless, wired, or a combination thereof. A similar type of connection can also be used to send the actual motion data to the game computing system 130. A USB compliant cable is an example of a wired connector that can be used. The input port 121 can be a RLA monitor port. The actual motion data provides a state update for a game engine and renderer of the game computing system 130 to employ for making event decisions and for rendering subsequent scene images or image sequences of the video game that is sent to monitor 120 for display.

Monitor 120 is configured to display the generated image sequences as video on screen 122. In addition to input port 121 and screen 122, monitor 120 also includes one or more processors represented by processor 124. Monitor 120 can also include additional circuitry or components, such as a communications interface, buffers, and other types of memory, that are typically included with a monitor. Each of these components of the monitor 120 can be coupled together via conventional connections typically used with computing devices. Monitor 120 can be configured to operate, for example, as monitor 200 in one or more of FIGS. 2-8.

Figure 2:
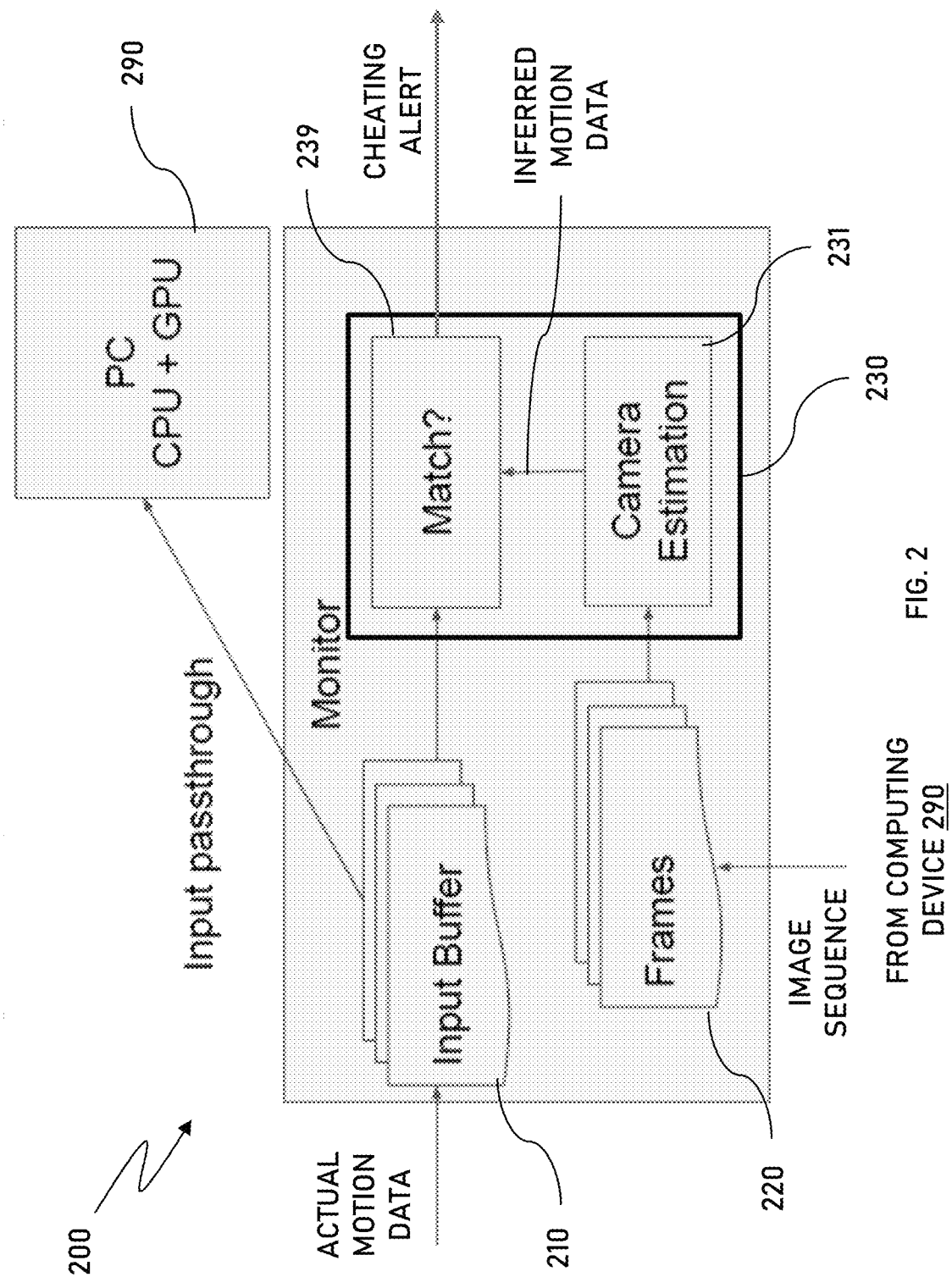
FIG. 2 illustrates a diagram of an example for detecting possible cheating in cursor motion-FPS games carried according to the principles of the disclosure.
Figure 3:
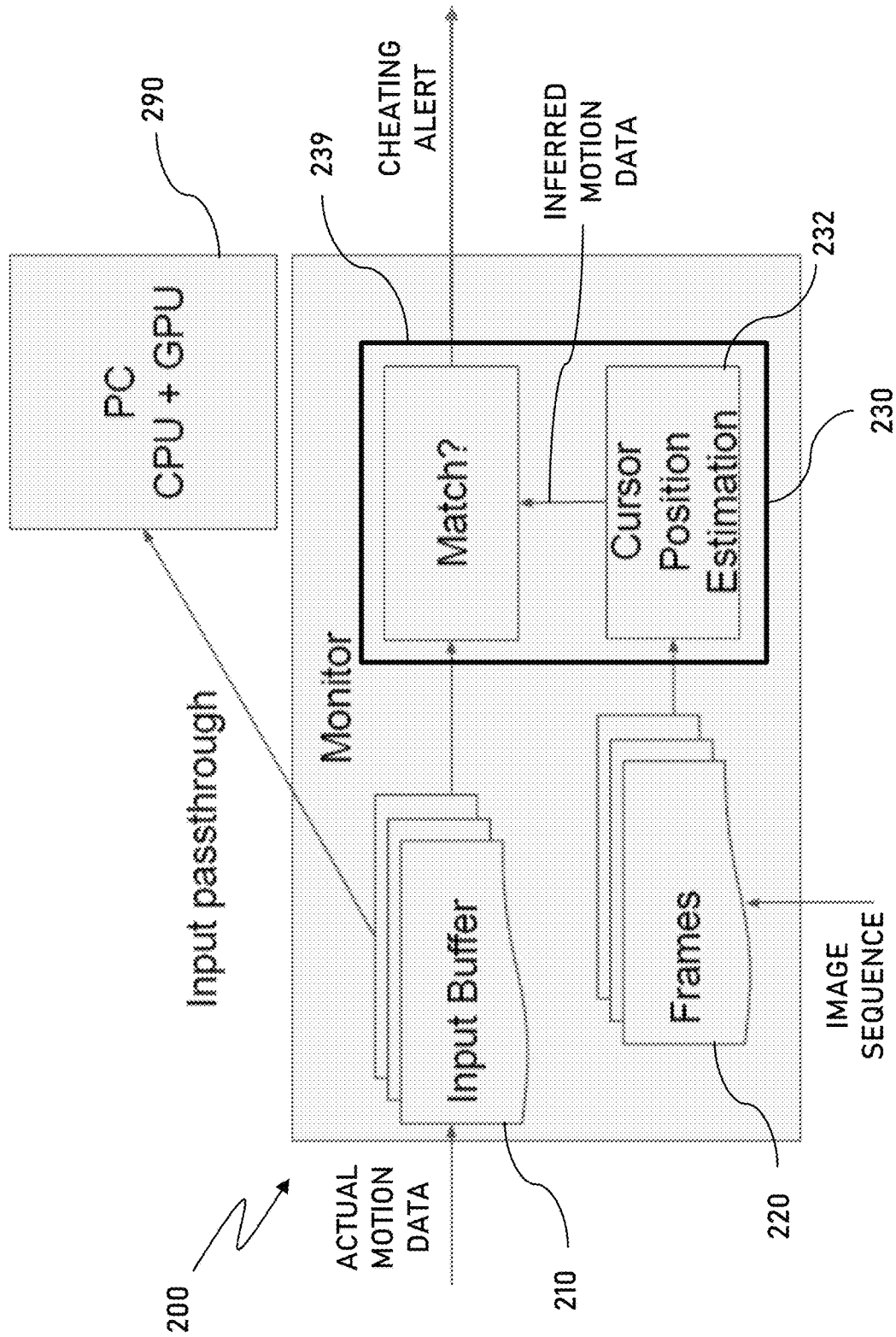
FIG. 3 illustrates a diagram of an example for detecting possible cheating in camera motion-FPS games according to the principles of the disclosure.
Figure 4:
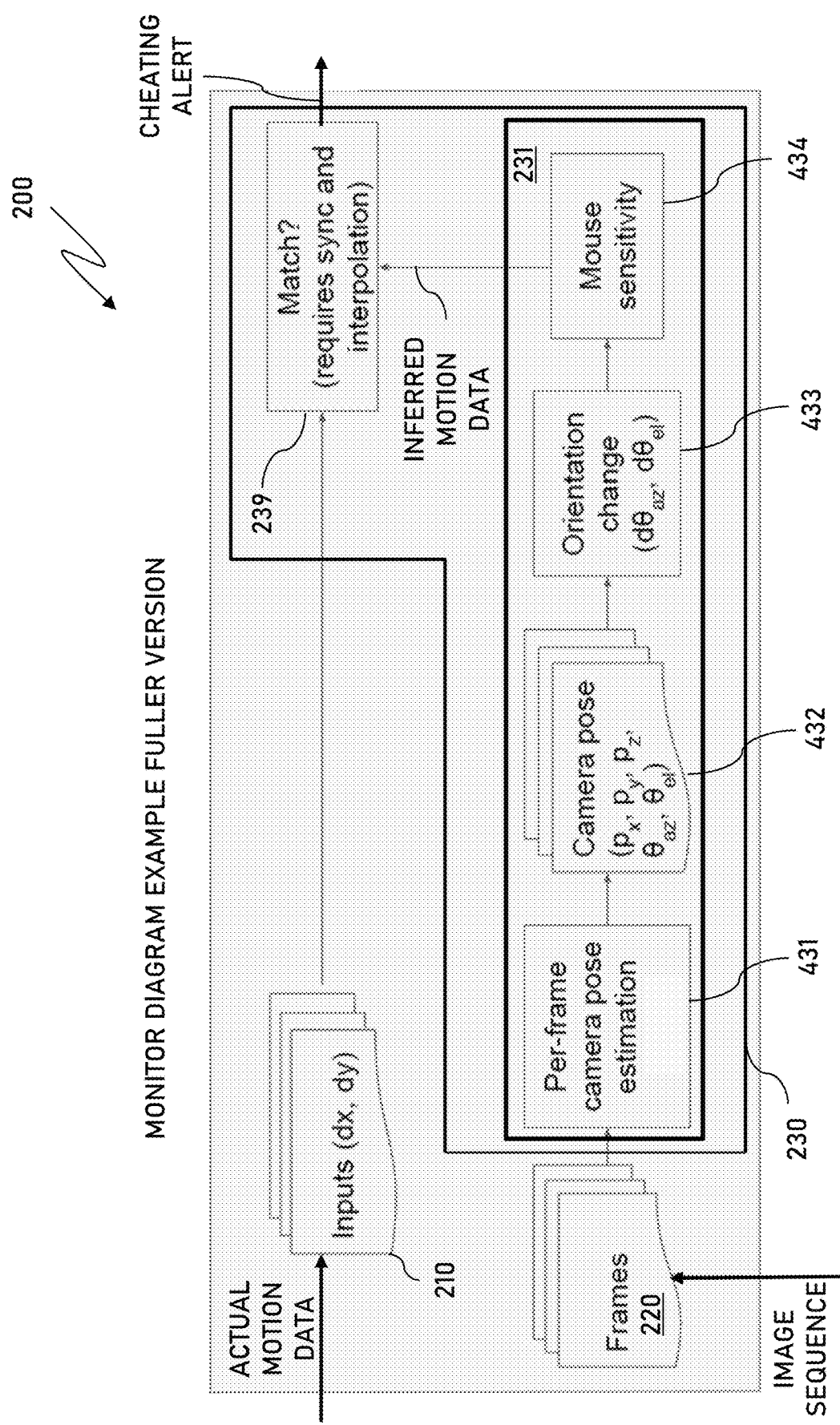
FIG. 4 illustrates a diagram of an example for detecting possible cheating in cursor motion-FPS games that includes an example of processing image sequences for camera estimation according to the principles of the disclosure.
Figure 5:
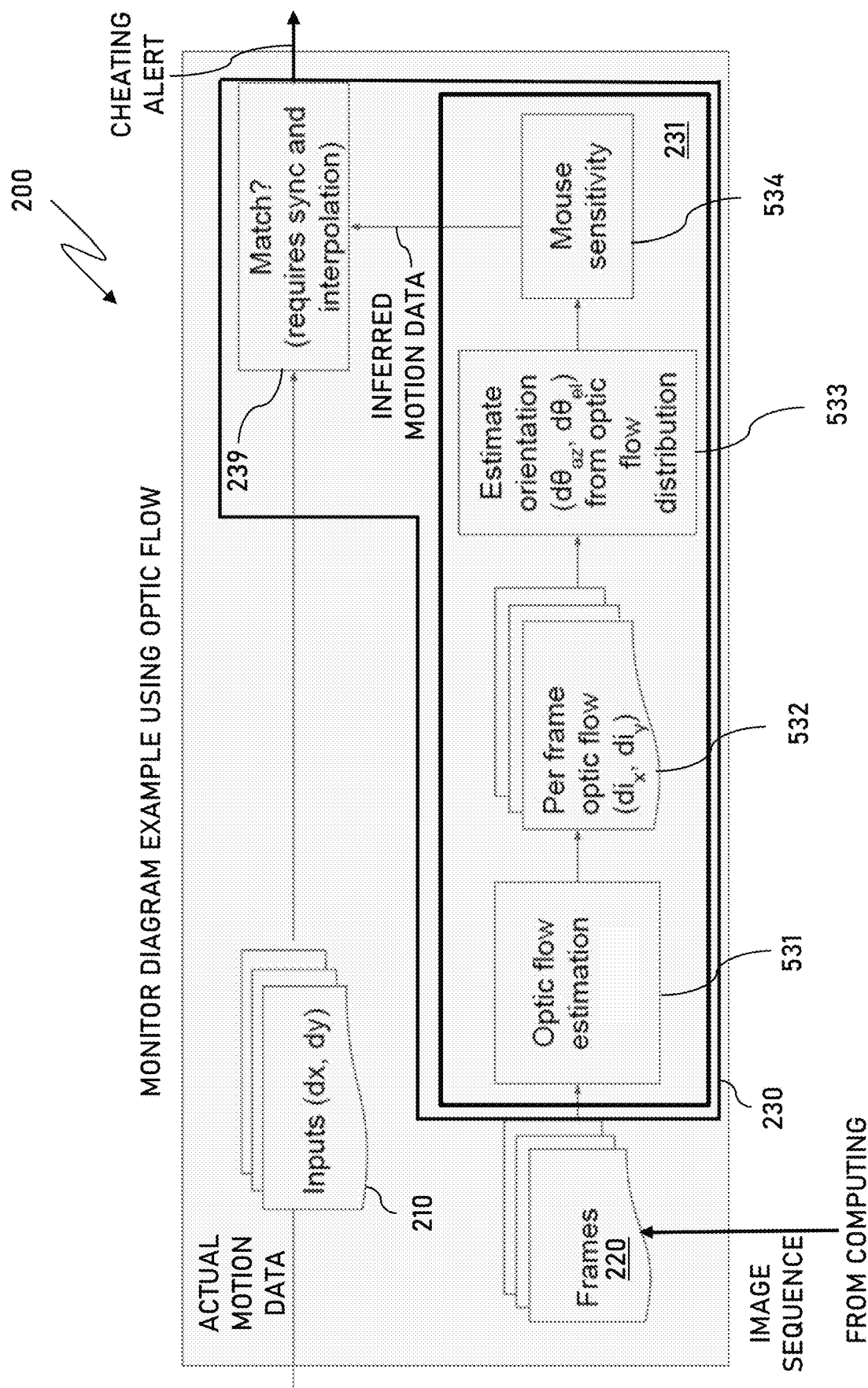
FIG. 5 illustrates a diagram of an example for detecting possible cheating in cursor motion-FPS games that includes another example of processing image sequences for camera estimation according to the principles of the disclosure.
Figure 6:
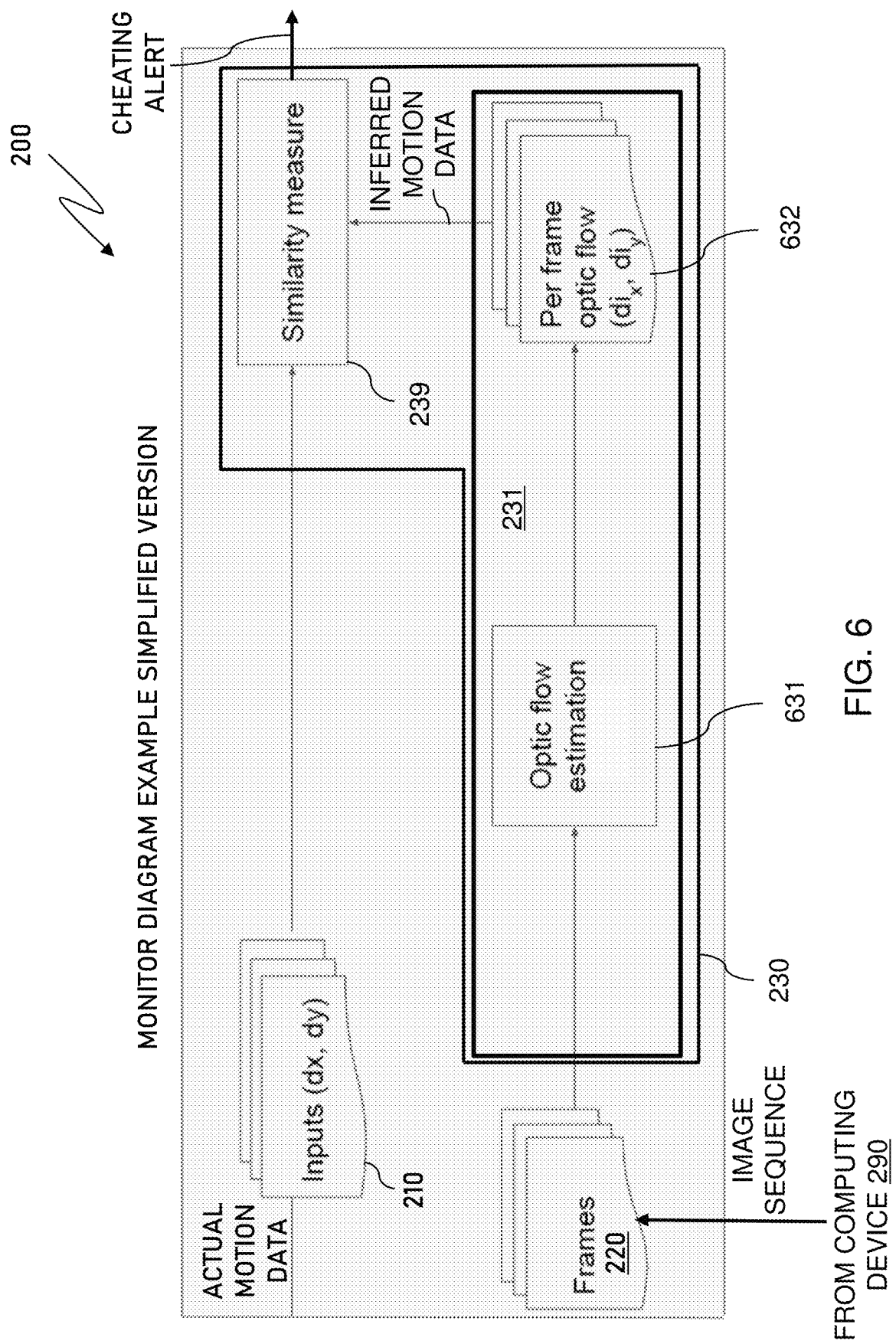
FIG. 6 illustrates a diagram of an example for detecting possible cheating in cursor motion-FPS games including yet another example of processing image sequences for camera estimation according to the principles of the disclosure.
Figure 7:
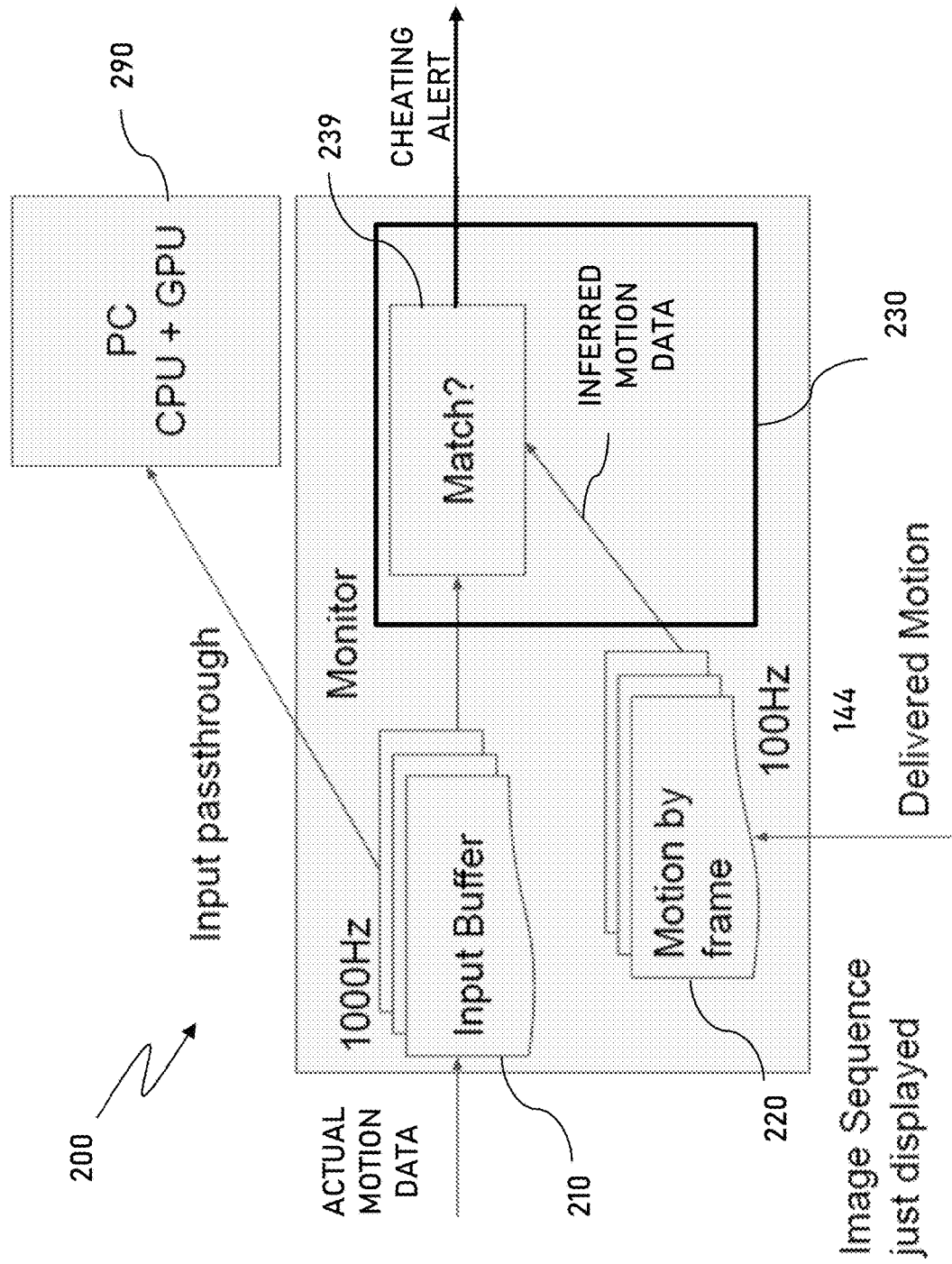
FIG. 7 illustrates a diagram of an example for detecting possible cheating in cursor motion-FPS games wherein a monitor receives inferred motion data.
Figure 8:
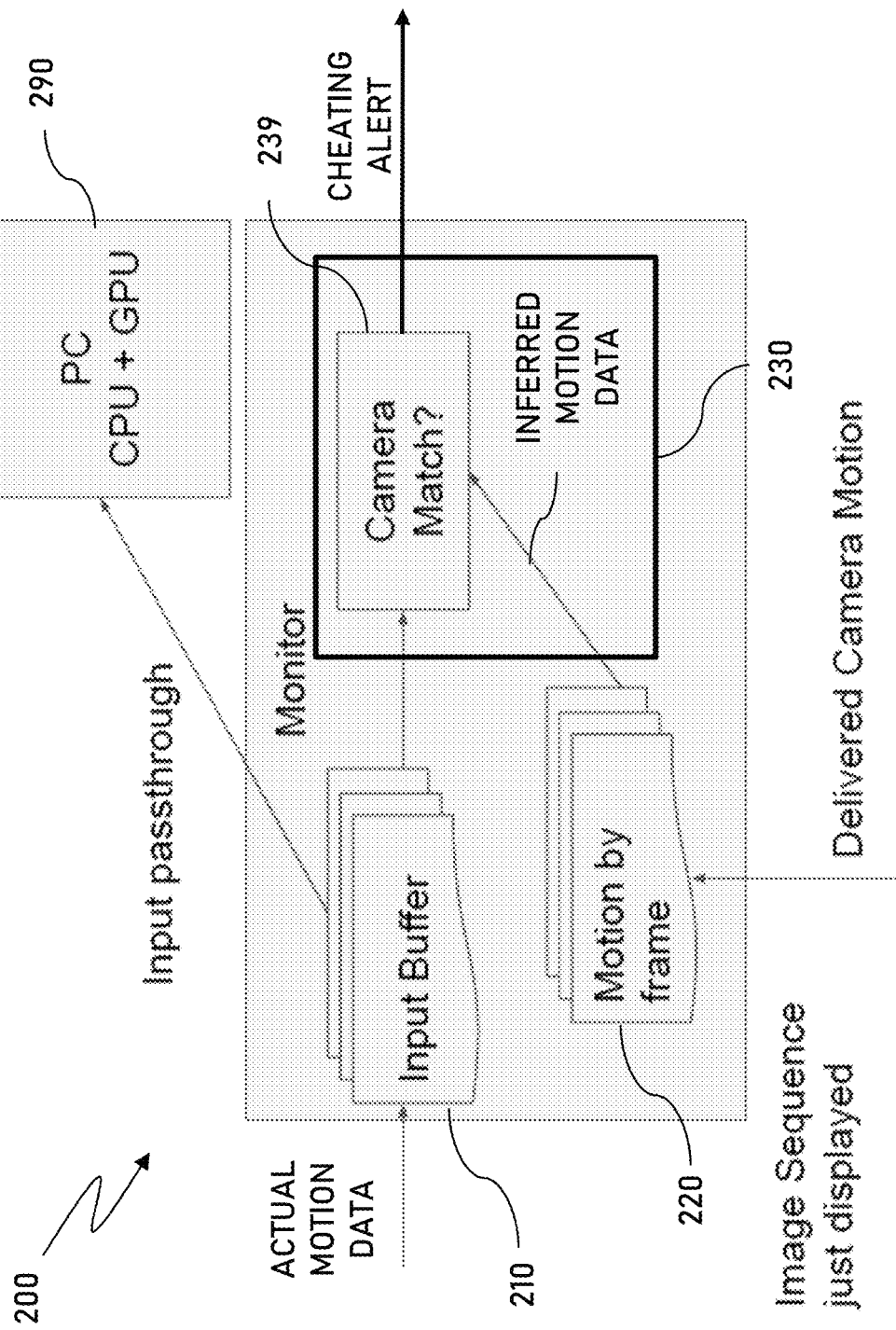
FIG. 8 illustrates a diagram of an example for detecting possible cheating in camera motion-FPS games wherein a monitor receives inferred motion data.

The processor 124 directs the operation of the monitor 120, which includes displaying received image sequences on screen 122. In addition, the processor 124 is configured to detect possible cheating by comparing the actual motion data to inferred motion data determined from the image sequences. The processor 124 can process the received image sequences differently to determine the inferred motion data and matches based on the type of video game being executed. FIGS. 2-8 provide examples of different options for the processor 124 to detect possible cheating for various types of video games. The principles taught by these FIGS. 2-8 can also be applied to other interactive programs. FIGS. 2-3 illustrate examples for processing cursor motion-FPS games (FIG. 2) and camera motion-FPS games (FIG. 3). FIGS. 4-6 illustrate block diagrams showing additional details for determining the inferred motion data and comparing to the actual motion data. The processor 124 can also receive the inferred motion data in addition to the image sequences. FIGS. 7-8 illustrate examples of monitor 120 receiving the inferred motion data for a cursor motion-FPS games (FIG. 7) and camera motion-FPS games (FIG. 8). In a cursor motion video game, movement of the input device, such as a mouse, corresponds to the cursor moving on the screen until it reaches the edge of the screen. For camera motion video games, movement of the input device translates to a rotation of the camera in the game world.

When possible cheating is detected, the processor 124 can generate a cheating alert that can be sent to the game developer or another designated monitor for further analysis. For example, the cheating alert can be sent to server 136 that includes an overall cheat detection system. The cheat detection system can include one or more processors to perform operations including receiving cheating alerts associated with a user executing a video game and determining a likelihood of cheating by the user based on the cheating alerts received over a designated amount of time. The type of the cheating alerts can be based on a comparison of actual motion data from an input device used by a user playing the video game and inferred motion data corresponding to an image sequence of the video game that is displayed.

Depending on the configuration of the game computing system 130, the cheating alert can be directly sent to the server 136 or can be sent via the computing device 132 as shown in FIG. 1.

The computing device 132 can be a local client computing device having interfaces for connecting to the monitor 120 and the server 136. For example, the computing device 132 can be a desktop, laptop, computing pad, or a dedicated gaming device. The computing device 132 receives motion data from monitor 120 via a device interface, such as a USB port. When a cheating tool is present on the computing device 132 or between the user input device 110 and the computing device 132, the motion data that is received by the game engine 135 can be altered or modified, such as using synthetic motion to provide aim assistance. The altered motion data can be referred to as modified motion data. Regardless the location of the cheating tool, the game engine 135 receives the modified motion data and generates image sequences based thereon.

The game engine 135 executes the video game using the modified motion data and other game state information and sends the image sequences to the monitor 120 for display on the screen 122. When generating the image sequences, the game engine 135 determines motion between the different frames. Depending on the type of video game, the motion can be camera motion or cursor motion. In addition to the image sequences, the computing device 132 can also send the determined motion from the game engine 135 to the monitor 120. As such, the monitor 120 can use the already determined motion data from the game engine 135 as inferred motion data and would not need to determine inferred motion data from the received image sequences.

FIGS. 2-3 illustrate a block diagram of an example of a monitor 200 configured to detect possible cheating of a user when playing a video game by comparing inferred motion data from image sequences to actual motion data according to the principles of the disclosure. Monitor 200 includes an input buffer 210, a frame buffer 220, and a processor 230. The monitor 200 can also include additional components such as an input port and a communications interface. Additionally, monitor 200 is connected to a computing device 290 that generates image sequences of the video game and sends the image sequences to the monitor 200, such as via an HDMI display port. Computing device 290 can be a personal computer including one or more processors, such as CPUs and GPUs. Computing device 290 can be configured to operate, for example, as computing device 132 in FIG. 1.

The monitor 200 receives actual motion data, such as via an input port, which is stored on the input buffer 210. The actual motion data is also forwarded to computing device 290, such as via a USB port. A sequence of the actual motion data can be stored on the input buffer 210. The frame buffer 220 is used to store multiple frames of the image sequences received from the computing device 290. The processor 230 estimates inferred motion data from the image sequences stored on the frame buffer 220 and compares the inferred motion data to the actual motion data in the input buffer 210 and determines possible cheating based on the comparison. The processing can be directed by a series of operating instructions stored on a memory associated with the processor 230 and that correspond to one or more algorithms for detecting possible cheating by comparing actual motion data to inferred motion data. FIG. 2 represents processing image sequences of a camera motion FPS video game and FIG. 3 represents processing image sequences of a cursor motion FPS game. The same reference numbers are used to denote the same elements in each of the drawings. Various computing blocks are denoted in FIGS. 2-3 (and also FIGS. 4-8) that correspond to different processing functionalities.

In FIG. 2, processor 230 estimates camera movement between frames of the image sequence stored on the frame buffer 220. The estimated movement, the inferred motion data, is then compared to the actual motion data to determine a match. Block 239 of processor 230 represents the matching based on comparing the actual motion data to the inferred motion data. When there is not a match, which can include within an acceptable tolerance, an alert is generated to indicate possible cheating. Monitor 200 can send a cheating alert to, for example, a higher level cheating system for further analysis. Since the actual motion data can be received at a different speed than the frames of the image sequence, an adjustment may be needed in block 239 to compare actual motion data and inferred motion data that correspond to the same frame, i.e., time period or time frame. For example, the same frame can be the mouse motion data and the image-derived camera motion data that was received over the last 20 milliseconds. Accordingly, time stamps associated with the frames of the image sequence and the actual motion data can be used to synch the actual and inferred motion data to ensure proper comparison. In addition to synching for disparate arrival times, synchronization may also include applying a fixed offset and/or a scale factor. Interpolation between frames may also be needed in block 239 for the comparing.

Block 231 of processor 230 in FIG. 2 represent the processing steps of camera estimation. For the camera estimation, processor 230 reconstructs the camera motion between the image sequence frames. Various algorithms known in the art can be used for the camera estimation. As discussed below in FIGS. 5-6, optic flow estimation is an example of an algorithm that can be used. In FIG. 3, processor 230 is configured to similarly operate as in FIG. 2 with the exception that motion associated with a cursor position is estimated from the image sequence frames instead of a camera position. As such, block 232 is shown in FIG. 3 to represent the processing step of cursor position estimation. Cursor position estimation can include determining the coordinates of the cursor on each frame of the image sequence stored on the frame buffer 220.

FIGS. 4-6 illustrate monitor 200 and examples of processor 230 processing image sequences for camera estimation and inferred motion data according to the principles of the disclosure. The disclosed examples can be performed in parallel and one result selected or an average selected for comparison. Other means of processing can also be used in parallel. Unlike FIGS. 2-3, computing device 290 is not illustrated in FIGS. 4-6. In FIG. 4, an example of camera estimation as noted in block 231 in FIG. 2 is provided. Blocks 431 to 434 represent the processing steps of camera estimation. For each frame from the frame buffer 220 an estimation of the camera position of the rendered camera is determined in block 431 and represented by positional information in block 432, such as, polar coordinates, azimuth angle, and elevation angle. Conventional algorithms used in the industry can be used for estimating the camera position. As the sequence of frames progress the difference, or orientation change, of the camera position between adjacent frames is determined 433, which provides the inferred motion data. Mouse sensitivity can then be applied 434 to the inferred motion data for adjustment.

The mouse sensitivity for the mouse that supplied the actual motion data can be retrieved from the game engine of the computing device 290. Alternatively, the mouse sensitivity data can be extracted from text files associated with the game engine or reverse engineered from the image sequences. False positives of possible cheating may result due to changes of mouse sensitivity by a user during game player. As such, a group of cheating alerts can be disregarded by monitor 200 or the higher level cheating system that is aware of the mouse sensitivity changes. The mouse sensitivity or the inverse of the mouse sensitivity can be applied.

For a mouse having acceleration, additional adjustments may also be applied. For example, the implementations for most mouse acceleration are specific to each video game and so the specific curves for a particular game would be supplied from the video game or operating system, such as from computing device 290. Once adjusted, the inferred motion data and the actual motion data are then compared in block 239 for determining a match and possible cheating.

FIG. 5 illustrates another example of processing image sequences for camera estimation 231 carried out according to the principles of the disclosure. Blocks 531 to 534 represent the processing steps of camera estimation. In this example, optic flow is estimated in block 531 from the frames of the image sequences and then from the optic flow the delta ($di_x$, $di_y$) of the rendered camera angle change per frame is determined in block 532. Optic flow is a well-known process in the industry to compute the motion of the pixels of image sequence frames. $di_x$, $di_y$ indicates the change in pixels, either individual pixels or a block or pixels, of the frames that is determined from the motion vectors computed by the optic flow process. The orientation of change of the azimuth and elevation of the camera position for a whole frame is then determined in block 533 and adjusted in block 534 per mouse sensitivity as discussed above with respect to FIG. 4. The inferred motion data is then compared to the actual motion data in block 239.

Instead of computing motion vectors, such as via optical flow, from the received image sequence, motion vectors computed by the game engine can be transmitted along with other image data to monitor 200. Monitor 200 could then estimate orientation using the delivered motion vectors. As noted above, the game engine can be part of the computing device 290. The game engine can also be located in a cloud computing platform.

FIG. 6 illustrates another example of processing image sequences for camera estimation carried out according to the principles of the disclosure. Blocks 631 and 632 represent the processing steps of camera estimation in FIG. 6. This example is similar to the processing in FIG. 5 but provides a simpler approach wherein optic flow is estimated in block 631 from the frames of the image sequences. Then from the optic flow the delta of the rendered camera angle change per frame is determined in block 632. The inferred motion data is then determined and compared to the actual motion data in block 239.

As noted above, FIGS. 7-8 illustrate examples of monitor 200 receiving the inferred motion data for a cursor motion-FPS games (FIG. 7) and camera motion-FPS games (FIG. 8). The received inferred motion data, cursor motion in FIG. 7 and camera motion in FIG. 8, can be sent by the game engine as part of the image data delivered to monitor 200. Instead of estimating from the image sequence frames, processor 230 compares the received inferred motion data to the actual motion data in block 239. As previously noted, the comparing can include synching and interpolation. For example, FIG. 7 indicates the actual motion data is received at 1000 Hz and the delivered inferred motion data is received at a display refresh rate of 144 Hz. Accordingly, processor 230 synchs the two types of motion data for a proper comparison. The inferred motion data can be delivered at another rate besides a display refresh rate. For example, an auxiliary channel of a HDMI cable can be used to deliver additional packets of inferred motion data at the full input buffer rate or another rate, such as within the range of the display refresh rate and the full input buffer rate. When delivered at the full input buffer rate, such as 1000 Hz in FIG. 7, the synching processing is simplified.

Figure 9:
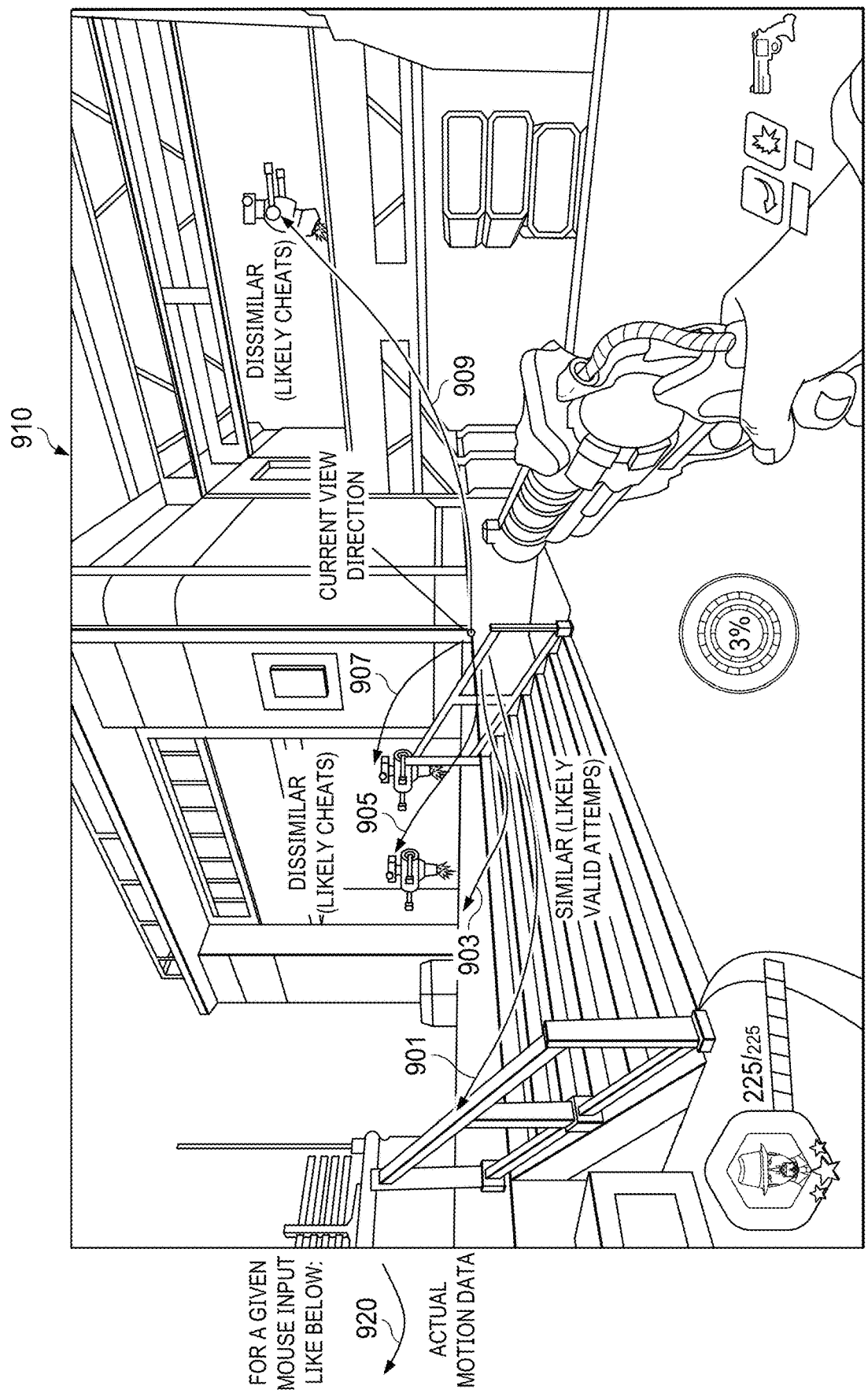
FIG. 9 illustrates a scene of a video game that has several cursor movements added to demonstrate an example of a cheating detection strategy according to the principles of the disclosure.

FIG. 9 illustrates a scene 910 (i.e., frame) of a video game that has several cursor movements added to demonstrate the disclosed cheating detection strategy. The scene 910 is from the video game Overwatch created by Blizzard Entertainment Inc., and is an example of a camera motion-FPS video game.

In addition to scene 910, FIG. 9 also includes an example of input motion, which is an XY path reconstructed from the actual motion data stored on an input buffer, such as input buffer 210. The input motion is represented by input curve 920 and can correspond to the duration of the input buffer.

The various output curves shown on scene 910 represent different examples of inferred motion data as described herein. As noted above, the inferred motion data can be delivered to a monitor from a game engine or can be determined by the monitor from image sequences, such as discussed in FIG. 2-6. In this example, the inferred motion data illustrate some results of an intervening cheating tool (dissimilar examples) and some results that are likely valid attempts (similar examples). Output curves 901 and 903 are similar to input curve 920 and represent attempts that are likely valid. Though not exactly like input curve 920, the shape of output curves 901 and 903 are similar to the shape of input curve 920. The shape of output curves 905, 907, and 909, however, are not similar to the shape of input curve 920. For example, there is no dip in output curves 905, 907, and 909 that corresponds to the dip of input curve 920. Additionally, the direction of output curves 905, 907, and 909, with respect to the current view direction is different from input curve 920. Whereas input curve 920 moves to the left with respect to the current view direction (as do output curves 901 and 903), output curves 905 and 907 move more up and to the left and output curve 909 moves up and to the right.

The similar and dissimilar examples also illustrate the different cheating alerts that can be sent based on comparing the output curves 901, 903, 905, 907, and 909 shown on the scene 910 to the actual motion data represented by input curve 920. The similar results could generate a cheating alert that indicates a 5 percent likelihood of cheating (output curve 901) or no cheating (output curve 903). Instead of a likelihood of cheating, the alert could be stated as a percentage of a likelihood of not cheating. For example, an alert can be generated for output curve 901 that indicates a 95 percent likelihood of no cheating. The different dissimilar results (moving left to right) could generate a cheating alert that indicates a 60 percent likelihood of cheating (output curve 905), an 80 percent likelihood of cheating (output curve 907), and a 99 percent likelihood of cheating (output curve 909).

Figure 10:
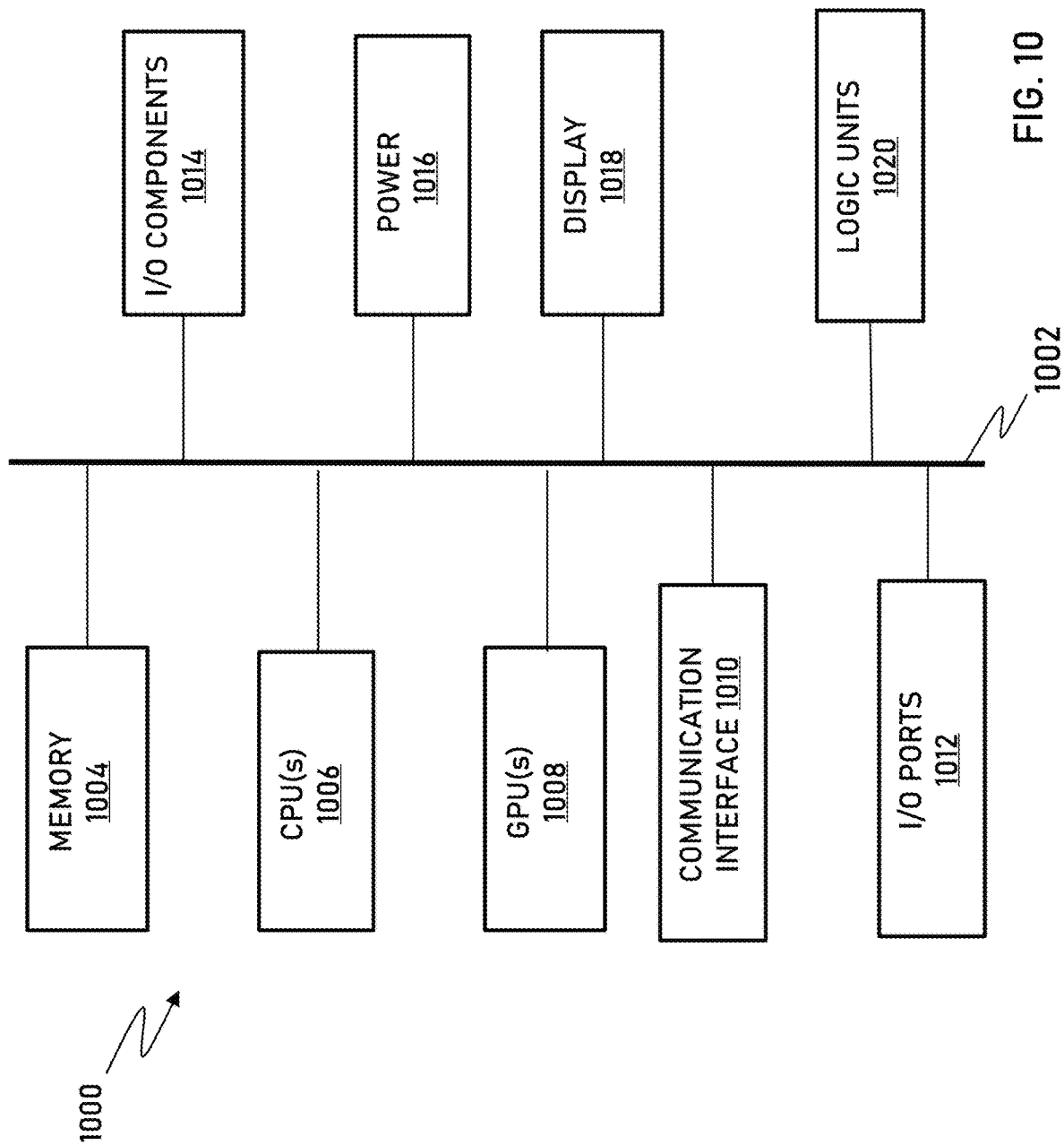
FIG. 10 illustrates a block diagram of an example of a computing device suitable for use in implementing at least a portion of some examples disclosed herein.

FIG. 10 illustrates a block diagram of an example of a computing device 1000 suitable for use in implementing at least a portion of some examples disclosed herein. Computing device 1000 may include an interconnect system 1002 that directly or indirectly couples the following devices: memory 1004, one or more CPUs 1006, one or more GPUs 1008, a communication interface 1010, input/output (I/O) ports 1012, input/output components 1014, a power supply 1016, one or more display 1018, and one or more logic units 1020.

Although the various blocks of FIG. 10 are shown as connected via the interconnect system 1002 with lines, this is not intended to be limiting and is for clarity only. For example, in some embodiments, display 1018, or another a presentation component, may be considered an I/O component 1014 (e.g., if the display 1018 is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device 1000 of FIG. 10 is merely illustrative. Distinction is not made between such categories as workstation, server, laptop, desktop, tablet, client device, mobile device, hand-held device, game console, electronic control unit (ECU), virtual reality system, and/or other device or system types, as all are contemplated within the scope of the computing device 1000 of FIG. 10. The computing device 1000, or at least portions thereof, can correspond to one or more of the computing devices associated with respect to FIGS. 1 to 9.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. There can be direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a computer program(s) and/or a program element(s)), such as an operating system and an interactive program (e.g., a video game). Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. One or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link), which includes substantially in parallel. The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1012 may enable the computing device 1000 to be logically coupled to other devices including the I/O components 1014, the display 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. One of the I/O components 1014 can be an input device, such as input device 110, that provides actual motion data. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The display 1018 can be a monitor, a touch screen, a television screen, a HUD, other display types, or a combination thereof, and include audio presentation components such as speakers. The display 1018 may receive data from other components (e.g., the GPU(s) 1008, the CPU(s) 1006, etc.), and output the data (e.g., as an image, video, sound, etc.).

Instead of display 1018, a monitor may be used as an I/O component to display an interactive program. Monitor 120 provides an example of a monitor that can be used. As such, the monitor can include the logic for processing and comparing actual and inferred motion data and generating a cheating alert. The monitor can be connected to the system 1000 via an HDMI connection/cable, which can include an auxiliary connection.

Figure 11:
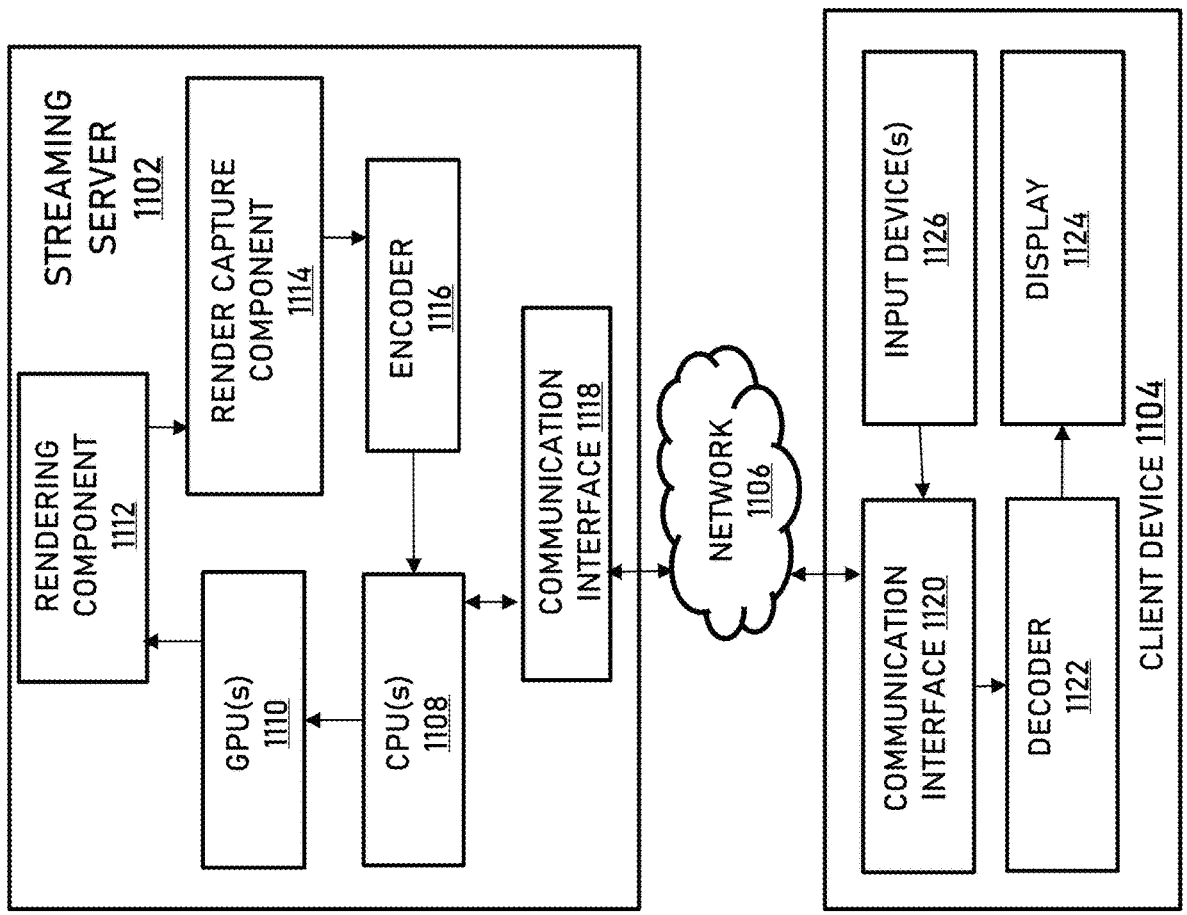
FIG. 11 illustrates a system diagram of an example of a streaming system, in which at least a portion of some examples disclosed herein can be implemented.

FIG. 11 illustrates a system diagram of an example of a streaming system, in which at least a portion of some examples disclosed herein can be implemented. FIG. 11 includes streaming server(s) 1102 (which may include similar components, features, and/or functionality to the example computing device 1000 of FIG. 10), client device(s) 1104 (which may include similar components, features, and/or functionality to the example computing device 1000 of FIG. 10), and network(s) 1106 (which may be similar to the network(s) described herein). The streaming system 1100 can be a game streaming system and the streaming server(s) 1102 can be a game streaming server(s).

In the system 1100, for an application session, such as a game session, the client device(s) 1104 may only, for example, receive input data in response to inputs to input device(s), transmit the input data to the streaming server(s) 1102, receive rendered images as encoded data from the streaming server(s) 1102, and display the encoded data as screen images on the display 1124. As such, the more computationally intense computing and processing is offloaded to the streaming server(s) 1102 (e.g., rendering—in particular ray or path tracing—for graphical output of the session is executed by GPU(s) of the streaming server(s) 1102). In other words, the session is streamed to the client device(s) 1104 from the streaming server(s) 1102, thereby reducing the requirements of the client device(s) 1104 for graphics processing and rendering. With the computationally intense computing and processing offloaded, as disclosed herein the client device 1104 can include imaging hardware for displaying image sequences sent from the streaming server 1102.

With respect to an instantiation of a game session as an example, a client device 1104 may be displaying a frame of the game session on the display 1124 based on receiving rendered images from the streaming server(s) 1102. The client device 1104 may receive a user input to one of the input device(s) 1126 and generate user input data (i.e., user input) in response. The client device 1104 may transmit the user input to the streaming server(s) 1102 via the communication interface 1120 and over the network(s) 1106 (e.g., the Internet), and the streaming server(s) 1102 may receive the user input via the communication interface 1118. CPU(s) 1108 may receive the user input, process the user input, and transmit the processed user input to GPU(s) 1110 that cause the GPU(s) 1110 to generate a rendering of the game session. For example, the user input may be representative of a movement of a character of the user in a game, firing a weapon, reloading, passing a ball, turning a vehicle, etc. The CPU(s) 1108 and the GPU(s) 1110 can cooperate to perform functions of an application engine for interactive programs as disclosed herein, such as game engine 135. The rendering component 1112 may render the game session (e.g., representative of the result of the user input) and the render capture component 1114 may capture the rendering of the game session as rendered images (e.g., data that can be displayed that captures the rendered frame of the game session). The rendering of the game session may include ray or path-traced lighting and/or shadow effects, computed using one or more parallel processing units—such as GPUs 1110, which may further employ the use of one or more dedicated hardware accelerators or processing cores to perform ray or path-tracing techniques—of the streaming server(s) 1102. The encoder 1116 may then encode the rendered images to generate encoded data (encoded rendered images) that can be transmitted to the client device 1104 over the network(s) 1106 via the communication interface 1118. The client device 1104 can receive the encoded rendered images via the communication interface 1120 and the decoder 1122 may decode the encoded rendered images for display on a screen of the display 1124.

In FIG. 11, display 1124 and input device(s) 1126 are part of client device 1104. In other examples, a monitor, such as monitor 120, can be connected to the client device 1104 and display the rendered images. The input device(s) 1126 can be coupled to the monitor to deliver actual motion data, which the monitor can provide to the client device 1104. Monitor 120, computing device 132, and server 136 can be implemented on streaming system 1100. Streaming server 1102 or another server connected to network 1106 can include a cheat detection system that receives cheating alerts for analysis.

Figure 12:
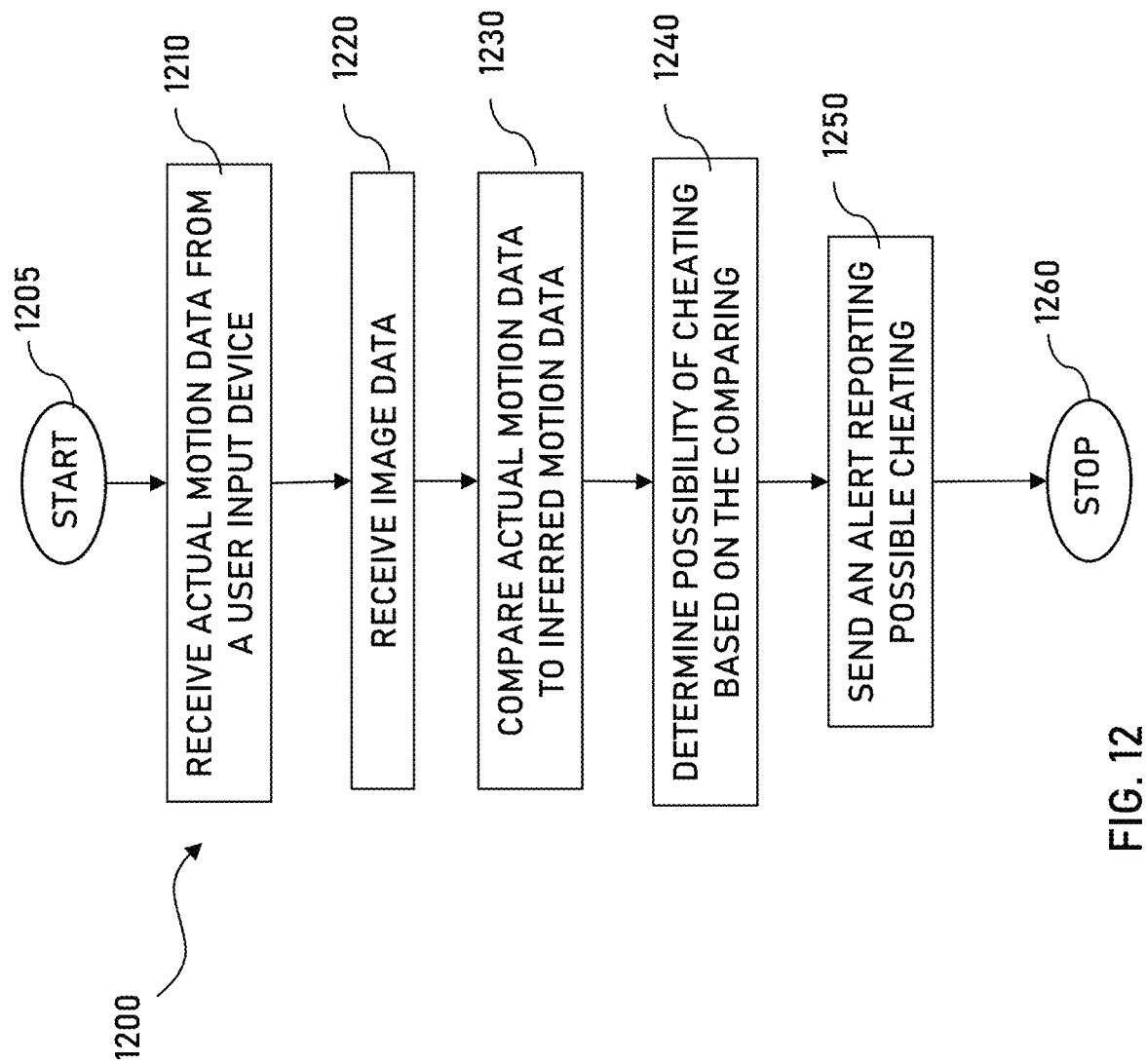
FIG. 12 illustrates a flow diagram of an example of a method of monitoring cheating in interactive programs carried out according to the principles of the disclosure.

FIG. 12 illustrates a flow diagram of an example of a method 1200 of monitoring cheating in interactive programs carried out according to the principles of the disclosure. One or more of the steps of method 1200 can be carried out by a series of operating instructions, which causes at least one processor to implement one or more of the steps of method 1200. The series of operating instructions correspond to an algorithm or algorithms that, for example, detect possible cheating based on comparing actual motion data from an input device to inferred motion data from image sequences. The series of operating instructions can be stored on a non-transitory computer-readable medium of a computer program product. The non-transitory computer-readable medium could be any type of non-transitory computer-readable medium, e.g., a solid-state memory, a fixed optical disk, etc. The at least one processor can be one of the processors of computing device 132 of FIG. 1 or computing device 290 of FIG. 2. At least a portion of the method 1200 can be performed by a computing system, such as computing system 100 of FIG. 2. The method 1200 begins in step 1205.

In step 1210, actual motion data is received from a user input device. The actual motion data corresponds to interacting with an interactive program, such as a video game. A monitor can receive and store the actual motion data from the user input device in an input buffer.

In step 1220, image data of the interactive program is received. The image data includes image sequences of the interactive program to display on a screen. The screen can be integrated with the monitor. The monitor can receive the image sequences and store the image sequences in a frame buffer.

The actual motion data is compared to inferred motion data in step 1230. The image data can include the inferred motion data. The inferred motion data can also be determined from the image sequences. For example, the inferred motion data can be estimated from the image sequences and the estimating can be performed at the monitor. The estimating can include per-frame camera pose estimating, determining camera pose coordinates for each frame of the image sequence, calculating an orientation change for the image sequence, and adjusting using mouse sensitivity. In an example, estimating the inferred motion data can include one or more of estimating optic flow from the image sequence, determining per frame optic flow change, estimating orientation from optic flow distribution, and adjusting for mouse sensitivity. For the comparing, the inferred motion data is synched with the actual motion data.

As noted above, the interactive program can be a video game. The video game can be a camera motion game wherein the inferred motion data is camera motion. The video game can also be a cursor motion game wherein the inferred motion data is cursor motion.

In step 1240, the possibility of cheating is determined based on the comparing and a cheating alert is sent in step 1250 when a possibility of cheating is determined. The cheating alert can be sent to a cheat detection system and can indicate a percentage of a likelihood of cheating or no cheating based on the comparing. The method 1200 continues to step 1260 and ends.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein. The data storage media can be part of or associated with the digital data processors or computers.

The digital data processors or computers can be comprised of one or more GPUs, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center.

The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip. Configured means, for example, designed, constructed, or programmed, with the necessary logic and/or features for performing a task or tasks.

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

A network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. In addition to previous examples not as a limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Those skilled in the art to which this application relates will appreciate that other and further additions, deletions, substitutions and modifications may be made to the described embodiments.

Various aspects of the disclosure can be claimed including those noted in the summary. Each of the aspects noted in the summary may have one or more of the elements of the dependent claims presented below in combination.

What is claimed is:

1. A method of monitoring cheating in interactive programs, comprising:
    receiving, at a first computing device, actual motion data from a user input device, wherein the actual motion data corresponds to interacting with an interactive program executing on a second computing device;
    receiving, from the second computing device, image data of the interactive program that includes an image sequence of the interactive program to display on a screen integrated with the first computing device;
    determining per frame optic flow change from the image sequence;
    estimating inferred motion data from the image sequence using the per frame optic flow change;
    comparing the actual motion data to the inferred motion data; and
    determining possible cheating based on the comparing, wherein the first and second computing devices are different devices.

2. The method as recited in claim 1, further comprising estimating optic flow from the image sequence and determining the per frame optic flow change using the optic flow estimation.

3. The method as recited in claim 2, further comprising estimating an orientation change for the image sequence from the per frame optic flow change and estimating, at the monitor, the inferred motion data using the orientation change for the image sequence.

4. The method as recited in claim 3, further comprising adjusting the inferred motion data using mouse sensitivity or the inverse of mouse sensitivity.

5. The method as recited in claim 3, further comprising adjusting the inferred motion data according to mouse acceleration.

6. The method as recited in claim 1, wherein the comparing includes synching the inferred motion data with the actual motion data.

7. The method as recited in claim 1, wherein the interactive program is a video game.

8. The method as recited in claim 7, wherein the video game is a cursor motion game and the inferred motion data is cursor motion.

9. The method as recited in claim 1, further comprising sending the actual motion data to the second computing device executing the interactive program and sending the image data from the second computing device to the first computing device.

10. The method as recited in claim 9, further comprising storing a sequence of the actual motion data in an input buffer of the monitor.

11. The method as recited in claim 9, further comprising storing the image sequence in a frame buffer of the monitor.

12. The method as recited in claim 1, further comprising sending a cheating alert based on the determining the possible cheating.

13. The method as recited in claim 12, wherein the cheating alert indicates a percentage of a likelihood of cheating or a likelihood of no cheating based on the comparing.

14. A computer program product having a series of operating instructions stored on a non-transitory computer readable medium that direct the operation of one or more processors to perform operations including:
    determining inferred motion data from image sequences received from a computing device, wherein the image sequences are from an interactive program executing on the computing device and the determining includes estimating per-frame camera pose of the image sequences, determining camera pose coordinates for each frame of the image sequence, and calculating an orientation change for the image sequence;
    comparing actual motion data to the inferred motion data determined from the image sequences, wherein the actual motion data is from a user input device and corresponds to interacting with the interactive program executing on the computing device; and
    determining possible cheating based on the comparing.

15. A monitor, comprising:
    a screen;
    an input port configured to receive actual motion data from a user input device, wherein the actual motion data corresponds to interacting with an interactive program on the screen; and
    one or more processors to perform operations including:
        receiving image data of the interactive program that includes image sequences of the interactive program to display on the screen;
        estimating inferred motion data from the image sequences determining per frame optic flow change using motion vectors, and estimating orientation of change using the per frame optic flow changes;
        comparing the actual motion data to the inferred motion data determined from the image sequences; and
        determining possible cheating based on the comparing.

16. The monitor as recited in claim 15, wherein the operations further include determining the motion vectors from the image sequences using optic flow.

17. A computing device for monitoring cheating, comprising:
    a screen;
    one or more interfaces to receive actual motion data from a user input device and image data, wherein the actual motion data corresponds to interacting with an interactive program, and the image data is from the interactive program and includes image sequences of the interactive program to display on a screen; and one or more processors to perform operations including:
  determining inferred motion data from the image sequences by estimating per-frame camera pose of the image sequences, determining camera pose coordinates for each frame of the image sequence, calculating an orientation change for the image sequence, and adjusting using mouse sensitivity;
  comparing the actual motion data to the inferred motion data determined from the image sequences; and
  determining possible cheating based on the comparing.

18. The computing device for monitoring as recited in claim 17, wherein the operations further include adjusting the inferred motion data according to mouse acceleration.

19. A cheat detection system for video game play, comprising:
  a computing device including an integrated screen and one or more processors that generates a cheat alert by comparing actual motion data from an input device used by a user playing a video game to inferred motion data determined from received image sequences of the video game displayed on the screen; and
  a streaming processor having one or more processors to perform operations including:
    receiving cheating alerts associated with a user executing the video game, wherein one type of the cheating alerts is the cheat alert generated by the computing device; and
    determining a likelihood of cheating by the user based on the cheating alerts received over a designated amount of time.

20. The system as recited in claim 19, wherein the computing device is a monitor.

* * * * *